United States Patent [19]
Boyle et al.

[11] Patent Number: 6,138,158
[45] Date of Patent: Oct. 24, 2000

[54] METHOD AND SYSTEM FOR PUSHING AND PULLING DATA USING WIDEBAND AND NARROWBAND TRANSPORT SYSTEMS

[75] Inventors: Stephen S. Boyle, Fremont; Mark A. Fox, San Francisco; Seetharaman Ramasubramani, San Jose; Bruce V. Schwartz, San Mateo; Bruce K. Martin, Jr., Palo Alto; Peter F. King, Half Moon Bay; Hanqing Liao, San Ramon, all of Calif.

[73] Assignee: Phone.Com, Inc., Redwood City, Calif.

[21] Appl. No.: 09/071,379

[22] Filed: Apr. 30, 1998

[51] Int. Cl.$^7$ ...................................................... G06F 13/00
[52] U.S. Cl. ........................ 709/225; 709/206; 709/219; 709/238; 709/318
[58] Field of Search .................................... 709/201, 202, 709/203, 206, 207, 213, 217, 218, 219, 225, 227, 238, 249, 250, 313, 318

[56] References Cited

U.S. PATENT DOCUMENTS

| | | | |
|---|---|---|---|
| 5,745,689 | 4/1998 | Yeager et al. | 709/206 |
| 5,790,789 | 8/1998 | Suarez | 709/202 |
| 5,790,790 | 8/1998 | Smith et al. | 709/206 |
| 5,892,909 | 4/1999 | Grasso et al. | 709/201 |

OTHER PUBLICATIONS

"HDTP Specification," *Unwired Planet, Inc.*, Version 1.1, Part No. HDTP–SPEC–DOC–101, Jul. 15, 1997, pp. 1–40.
"HDML 2.0 Language Reference," *Unwired Planet, Inc.*, Version 2.0, Part No. HDMLREF–DOC–200, Revision D, Jul. 1997, pp. 1–56.

*Primary Examiner*—Viet D. Vu
*Attorney, Agent, or Firm*—Stattler Johansen & Adeli LLP; Dag Johansen

[57] ABSTRACT

The present invention has particular applications to the navigation of Internet web pages using two-way interactive communication devices, such as a mobile device, a mobile phone, a landline telephone, and an Internet capable remote controller. According to one aspect of the present invention, each of the two-way interactive communication devices is a node in a distributed network, thus the devices can access hypermedia or hierarchic layers of information stored in server devices on the network. When one or more pages of information are updated, rather than sending the entire updated information to users of the devices subscribing to the updated information through the network, the present invention sends a notification to a proxy server that forwards the notification to the users using a messaging system via a low cost narrowband channel. Upon receiving the notification, the users can fetch the updates, when needed, through a wideband channel. Hence systemic solutions are provided in the present invention to integrate wideband and narrowband channels so as to keep the users informed of any updates to their desired information and meanwhile provide efficient means to the users for retrieving the latest updates without incurring uncontrollable costs and increasing unnecessary network traffics.

58 Claims, 13 Drawing Sheets

Landnet - 104

Airnet - 102
GSM
CDMA
CDPD
TDMA
PHS

METHOD AND SYSTEM FOR PUSHING AND PULLING DATA USING WIDEBAND AND NARROWBAND TRANSPORT SYSTEMS

BACKGROUND OF THE INVENTION

1. Field of Invention

The present invention relates generally to data communications, and in particular relates to a method and apparatus for integrating narrowband and wideband data transports to optimize the use of the wideband channel through the effective use of the narrowband channel.

2. Description of the Related Art

The Internet is a rapidly growing communication network of interconnected computers and computer networks around the world. Together, these millions of connected computers form a vast repository of hyperlinked information that is readily accessible by any of the connected computers from anywhere at any time. To provide mobility and portability of the Internet, wireless Internet computing devices were introduced and are capable of communicating, via wireless data networks, with the computers on the Internet. With the wireless data networks, people, as they travel or move about, are able to perform, through the wireless computing devices, exactly the same tasks they could do with computers on the Internet.

Regular mobile phones can return calls, check voice mail or enable users to be available for teleconferences anywhere at any time. However, new two-way interactive communication devices, such as mobile devices or mobile phones, would meld voice, data, and personal digital assistants (PDA) functionality into a single portable equipment that is not just reactive to calls but also proactive, through a proxy computer, accessing a myriad of public and enterprise information services in the Internet. For example, a traveler may request the departure time of a next available flight when on the way to an airport, or a trader may purchase shares of stock at a certain price. The pertinent information from these requests or transactions may include the airline and the flight number for the traveler, as well as the stock name, the number of shares and the price being purchased for the trader. To be timely and periodically informed, one way is to electronically communicate the information requests into a mobile device that is connected to a wireless data network. The wireless data network, for example, connects, through a proxy server, to a flight information server or stock quote server from which the desired flight information or the current stock price can be retrieved by the mobile device on demand.

Alternatively, the traveler or the trader may be preferably informed of any available immediate flight information or a stock price that has hit a pre-set preferred price. It is, however, sometimes disturbing to inform the traveler or the trader of any updated changes to the flight information or the current stock price, especially the stock price being updated every second during trading hours. There is, therefore, a great need for a solution for informing users of any updates to their desired information and allowing the users to retrieve the updated information when needed. Further, in a circuit-switched network, such as GSM, a mobile device must establish a circuit in a carrier infrastructure via a wideband channel before communicating with any server on the network. The connection, similar to a telephone line, can be both time consuming and costly to the users. Hence users generally prefer to have controls over the communication of their mobile devices through the carrier infrastructure when accessing updated information from a web server.

SUMMARY OF THE INVENTION

The present invention has been made in consideration of the above described problems and needs and has particular applications to the navigation of Internet web pages using two-way interactive communication devices, such as a mobile device, a mobile phone, a landline telephone, and an Internet capable remote controller.

According to one aspect of the present invention, each of the two-way interactive communication devices, referred to as client devices herein, is a node in a distributed network that comprises the Internet, the Intranet, or other private network along with an airnet. Thus the client devices can access hypermedia information or hierarchic layers or pages of information stored in server devices on the Internet, the Intranet, or other private network via the airnet. When one or more pages of information are updated, users of those client devices subscribing to the updated pages of information receive a notification from one of the server devices that stores the updated information. The notification, depending on an action type therein, upon arriving in the client devices may cause a local cached copy of the corresponding outdated information to be invalidated or to generate an alert message to get immediate attention from the users. Cache coherency is maintained when the users of the client devices navigate to the local cached copy that has been invalidated and causes the client devices to fetch the updated information from the server device.

According to another aspect of the present invention, the client devices communicate with the server devices through a link infrastructure. The link infrastructure, providing an interface between the Internet and the airnet, comprises a link device and a carrier infrastructure. The link device comprises a messenger and a pull engine while the carrier infrastructure comprises a message system (MS), such as a short message service center (SMSC), and an interworking function (IWF). When a notification is sent out from one of the server devices that holds an updated information subscribed by one of the client devices serviced by the link infrastructure, the notification is processed in the messenger to form a corresponding message transportable through MS and possibly IWF depending on whether a communication session has been established. More specifically, the messenger including the notification is coupled directly to MS that is responsible for sending the corresponding message through a narrowband channel to the targeted client device. Upon receiving the corresponding message, the targeted client device is caused to send a request to establish a communication session with the pull engine in the link infrastructure through the wideband channel so as to fetch the updated information from the server that holds the updated information. When the client device is authenticated by the link device, the communication session is established and the updated information is fetched into the link device that further forwards the fetched information to the client device.

Still according to another aspect of the present invention, the messenger comprises a notification manager that assigns a sequence identification to every notification received via the distributed network and a queue list to keep those notifications that could not be successfully delivered. The sequence identification is tractable, such as monotonically and evenly increased numbers, so that each notification is assigned with a unique but tractable sequence number. Similarly, the client device maintains a register to keep the sequence numbers of the notifications received. The sequence number of the last received notification is forwarded to the pull engine in the link device by the client device when the communication session is established. The pull engine consults with the messenger on the forwarded sequence number. If the forwarded sequence number does not match what the notification manager has assigned, which indicates that there are some undelivered notifications in the queue list, the pull engine retrieves those undelivered notifications in the queue list and forwards them to the client device through the wideband channel in which the communication session has been established. With respect to the number of the undelivered notifications received in the client device, the register updates accordingly to prevent the client device to act from the same undelivered notifications that may be forwarded by MS through the narrowband channel.

Still according to another aspect of the present invention, the messenger further comprises an encoder that encodes the corresponding message into a string of alphanumeric characters if MS can only deliver messages of alphanumeric characters. When the corresponding message exceeds the maximum length of messages that MS can deliver, the messenger further includes a message segmenter that segments the corresponding message into a plurality of message fragments and each of the message fragments, preferably sequentially labeled, is respectively and successively sent by MS to the targeted client device. The client device typically proceeds with a reversed process upon receiving the fragments from MS.

Accordingly, an important object of the present invention is to provide a generic solution for informing users of any updates to desired information and allowing users to retrieve the updated information when needed.

Another object of the present invention is to provide a system for systemic solutions for integrating wideband and narrowband channels to keep the users informed of any updates to their desired information and providing efficient means to the users for retrieving the latest updates without incurring uncontrollable costs and increasing unnecessary network traffics.

Other objects, together with the foregoing are attained in the exercise of the invention in the following description and resulting in the embodiment illustrated in the accompanying drawings.

BRIEF DESCRIPTION OF THE DRAWINGS (TO BE UPDATED)

These and other features, aspects, and advantages of the present invention will become better understood with regard to the following description, appended claims, and accompanying drawings where:

DETAILED DESCRIPTION OF THE INVENTION

Notation and Nomenclature

In the following detailed description of the present invention, numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention.

The detailed description of the present invention in the following are presented largely in terms of procedures, steps, logic blocks, processing, and other symbolic representations that resemble of data processing devices coupled to networks. These process descriptions and representations are the means used by those experienced or skilled in the art to most effectively convey the substance of their work to others skilled in the art. The present invention is a method and system for integrating narrowband and wideband channels for efficiently transporting latest updated information. The method along with the system to be described in detail below is a self-consistent sequence of processes or steps leading to a desired result. These steps or processes are those requiring physical manipulations of physical quantities. Usually, though not necessarily, these quantities may take the form of electrical signals capable of being stored, transferred, combined, compared, displayed and otherwise manipulated in a computer system or electronic computing devices. It proves convenient at times, principally for reasons of common usage, to refer to these signals as bits, values, elements, symbols, operations, messages, terms, numbers, or the like. It should be borne in mind that all of these similar terms are to be associated with the appropriate physical quantities and are merely convenient labels applied to these quantities. Unless specifically stated otherwise as apparent from the following description, it is appreciated that throughout the present invention, discussions utilizing terms such as "processing" or "computing" or "verifying" or "displaying" or the like, refer to the actions and processes of a computing device that manipulates and transforms data represented as physical quantities within the computing device's registers and memories into other data similarly represented as physical quantities within the computing device or other electronic devices.

The Preferred Embodiment

Figure 1:
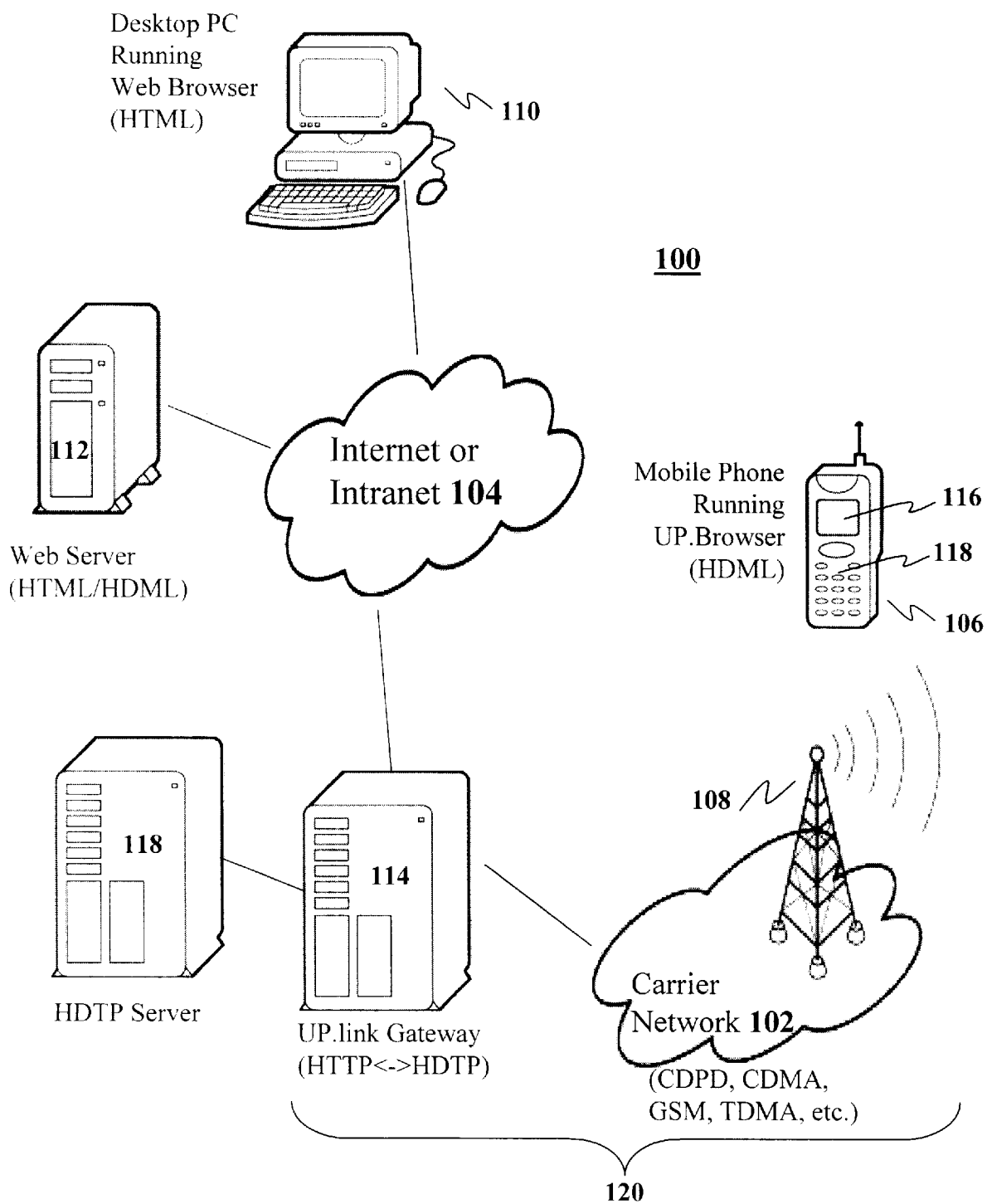
FIG. 1 illustrates a schematic configuration in which the present invention may be practiced.

Referring now to the drawings, in which like numerals refer to like parts throughout the several views. FIG. 1 illustrates a schematic configuration in which the present invention may be practiced. A data network 100 comprises an airnet 102 that is generally called wireless network and a landnet 104 that is generally a landline network, each acting as a communication medium for data transmission therethrough. Airnet 102, in which the data transmission is via the air, is sometimes referred to as a carrier network as well because each airnet is controlled and operated by a carrier, for example AT&T and GTE, each having its own communication scheme, such as CDPD, CDMA, GSM and TDMA for airnet 102.

Referenced by 106 is one of the two-way interactive communication devices that can be a mobile device, a cellular phone, a landline telephone or a wireless capable remote controller, capable of communicating, via airnet 102, with an antenna 108 that also represents a carrier infrastructure. It is generally understood that the carrier infrastructure or antenna 108 serves simultaneously a plurality of the two-way interactive communication devices, of which only one mobile device 106 is shown in the figure. Similarly, connected to Internet 104 are a plurality of desktop personal computers (PC) 110 and a plurality of web server computers 112, though only one representative, respectively, is shown in the figure. PC 110, as shown in the figure, may be a personal computer SPL 300 from NEC Technologies Inc. and runs a HTML Web browser via the Internet 104 using HTTP to access information stored in web server 112 that may be a workstation from SUN Microsystems Inc. It is understood to those skilled in the art that PC 110 can store accessible information therein so as to become a web server as well.

When any content in one of the web servers get updated, the mobile devices that subscribe to the updated content must be made aware of the update as many of the mobile devices may have cached a local copy of the outdated content. Instead of constantly sending the updates to update the local copy in the mobile devices through the Internet 104 and airnet 102, which can cause heavy traffic in the networks, the present invention allows the web server that has the updated content to send a notification, or an electronic message, to the mobile devices so as to make users thereof aware that an update to the local copy in the mobile devices has occurred at the web server. The users can then make a decision to fetch the update.

Between the Internet 104 and the airnet 102 there is a link infrastructure 120 that comprises a link server device 114 and the carrier infrastructure 108. Link server device 114, also referred to as proxy server or gateway server, may be a workstation or a personal computer and performs mapping or translation functions, for example, mapping from one protocol to another, thereby the mobile device 106 can be in communication with any one of the servers 112 or the PCs 110, respectively via the carrier infrastructure 108. Carrier infrastructure 108 generally comprises a base station and an operations and maintenance center. The base station controls radio or telecommunication links with the mobile devices. The operations and maintenance center comprises a mobile switching center performing the switching of calls between the mobile devices and other fixed or mobile network users. Further the operations and maintenance center manages mobile services, such as authentication and oversees the proper operation and setup of a wireless network. Each of the hardware components and processes in the base station and the operations and maintenance center is known to those skilled in the art and not to be described herein to avoid unnecessarily obscuring aspects of the present invention.

The communication protocol in the Internet 104 is the well known HyperText Transfer Protocol (HTTP) or HTTPS, a secure version of HTTP, and runs on TCP (Transmission Control Protocol) and controls the connection of a well known HyperText Markup Language Web browser, or HTML Web browser in PC 110, to Web server 112, and the exchange of information therebetween. The communication protocol between mobile device 106 and link server 114 via airnet 102 is Handheld Device Transport Protocol (HDTP) (formerly known as Secure Uplink Gateway Protocol (SUGP)), which preferably runs on User Datagram Protocol (UDP) and controls the connection of a HDML Web browser in mobile device 106, to server 114, where HDML stands for Handheld Device Markup Language. HDML, similar to that of HTML, is a tag based document language and comprises a set of commands or statements specified in a card that specifies how information displayed on a small screen of the mobile device 106. Normally a number of cards are grouped into a deck that is the smallest unit of HDML information that can be exchanged between the mobile device 106 and the proxy server 114. The specifications of HDTP, entitled "HDTP Specification" and HDML, entitled "HDML 2.0 Language Reference" are enclosed and incorporated herein by reference in their entirety. The HDTP is a session-level protocol that resembles HTTP but without incurring the overhead thereof and is highly optimized for use in thin devices, such as the mobile devices, that have significantly less computing power and memory than that in a desktop personal computer. Further it is understood to those skilled in the art that the UDP does not require a connection to be established between a client and a server before information can be exchanged, which eliminates the need of exchanging a large number of packets during a session creation between a client and a server. Exchanging a very small number of packets during a transaction is one of the desired features for a mobile device with very limited computing power and memory to effectively interact with a landline device.

To facilitate the description of the disclosed system, however, it is deemed necessary to recite some of the features in mobile device 106 that make the disclosed system work more efficiently. According to one embodiment, mobile phone 106 comprises a display screen 116 and a keyboard pad 118 that allow a user thereof to communicate interactively with the mobile phone. The hardware components including a microcontroller, a ROM and a RAM, referring to working memory, in mobile phone 106 are known to those skilled in the art. The compiled and linked processes of the present invention are typically stored in the ROM as a client module that causes mobile device 106 to operate with proxy server 114. With display screen 116 and keypad 118, a user of mobile device 106 can interactively communicate with proxy server 114 over airnet 102. Upon activation of a predetermined key sequence utilizing keypad 118, for example, the microcontroller initiates a communication session request to proxy server 114 using the client module in the ROM. Upon establishing the communication session, mobile device 106 typically receives a single HDML deck from proxy server 114 and stores the deck as cached in the RAM. As described above, an HDML deck comprises one or more cards and each card includes the information required to generate a screen display on display screen 116. The number of cards in a card deck is selected to facilitate efficient use of the resources in mobile device 106 and in airnet network 102.

Figure 2:
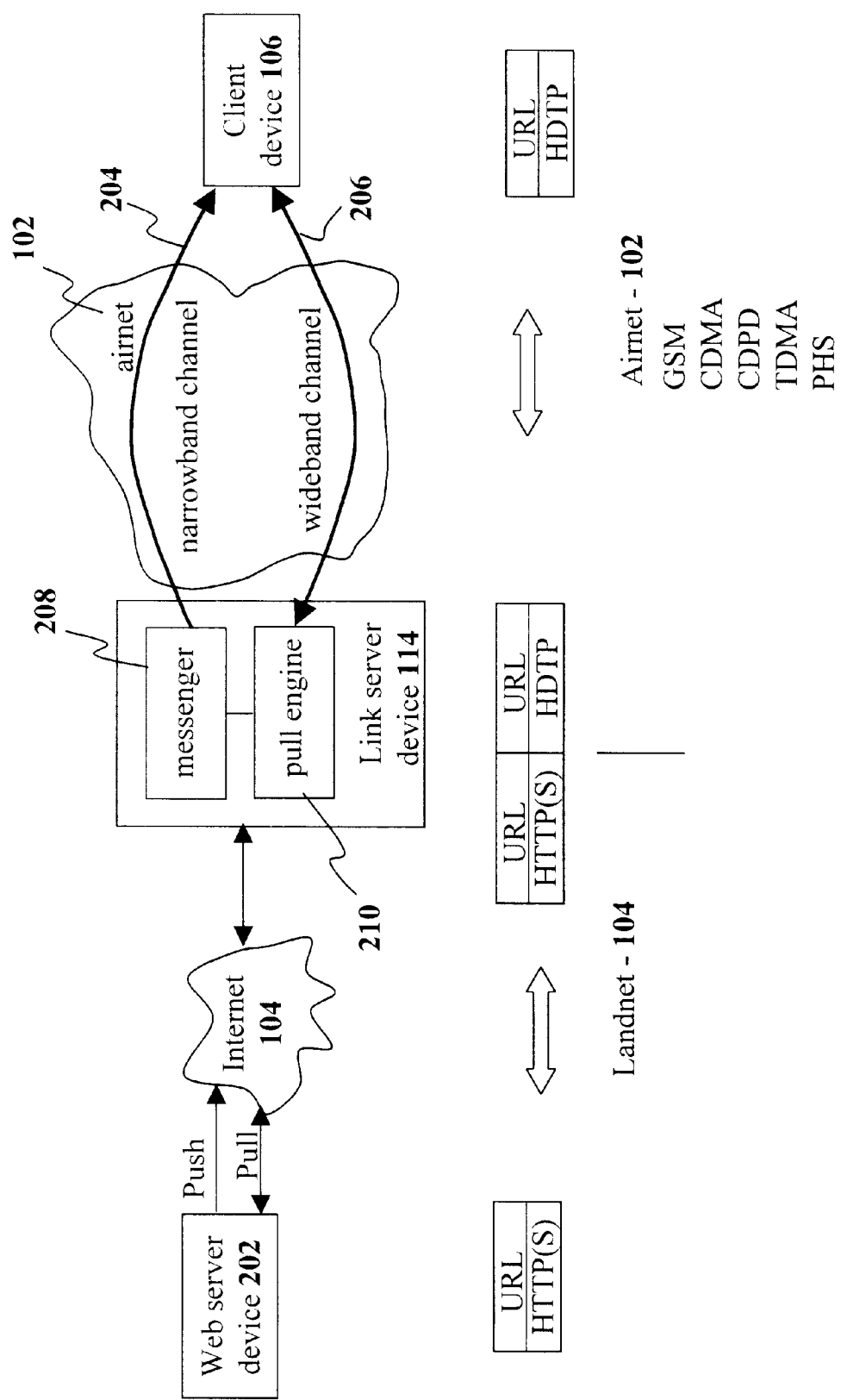
FIG. 2 illustrates a functional diagram of the disclosed system in the present invention.

Referring now to FIG. 2, there is shown a functional block diagram of the disclosed system. Web server device 202 provides accessible information to other computing devices on the Internet 104. Mobile device 106 accesses the information in web server device 202 via link server device 114 that is coupled to Internet 104. It should be noted that the communication between mobile device 106 and proxy server 114 is via the carrier infrastructure that is not part of the invention and therefore not shown in the figure to avoid unnecessarily obscuring aspects of the present invention. Further, to avoid possible ambiguities in further description of the present invention, server device, such as web server device 202 and link server device 114, means a piece of hardware equipment that comprises one or more microprocessors, working memory, buses and necessary interface and other components that are familiar to those skilled in the art while a server module means compiled and linked processes of the disclosed system loaded into the working memory to perform designated functions, according to the invention, through the parts and components in the server device. The same distinction is equally applied to mobile devices, referred to, for example, client device 106, and the client module as stated above.

Web server device 202 pushes a notification or a piece of electronic message to link server device 114 when there is a change or update to the information subscribed by mobile device 106. Accessible information is generally presented in hierarchical pages of hyperlinked HDML pages and each of the HDML pages is identified by a distinct address, such as an universal resource locator (URL). If the contents in one or more pages are updated, the corresponding URLs are included in the notification. As described before, rather than sending the entire updated pages in a new HDML deck through the Internet 104, link server device 114, airnet 102, and eventually to mobile device 106, the notification is sent to client device 106 asynchronously via messenger 208 to make the user of mobile device 106 aware that an update to the information the user fetched before has occurred, then it is up to the user to decide when to fetch the updates. The notification comprises:

an address—one or more URLs identifying the updated pages;

an action type—a flag to cause a mobile device to react accordingly upon receiving the notification; and a subscriber ID—a unique number identifying the mobile device that is targeted for receiving the notification; alternatively a (pushed) notification P is expressed as follows:

P(address, type, ID);

The notification is pushed or sent out from web server device 202 when there is an update to any subscribed information in web server device 202. When link server device 114 receives the notification, messenger 208 forwards the received notification to mobile device 106 via narrowband channel 204. Upon receiving the notification, mobile device 106 reacts according to the action type as to how to make a user of the mobile device 106 aware of the update at web server device 202. When the updated information is desired, the updated information can be accessed through a pull agent 210 via wideband channel 206 using the address embedded in the notification.

It should be noted that a narrowband channel and a wideband channel herein are a pair of relative terms. In other words, wideband channel 206 has a higher bandwidth than narrowband channel 204 does. The bandwidth means the capacity a communication channel has for carrying data through. Narrowband channel 204 is typically at 400 bits per second (bps) while wideband channel 206 is typically over 14400 bps. From the user perspective, the narrowband channel is the auxiliary channel provided by the carrier and therefore no cost or at a fixed cost to the users while the wideband channel typically initiated by the users and the usage thereof is measured and typically charged to the users who communicate with web server devices on the Internet through the wideband channel.

To be more specific, in circuit-switched network, such as GSM, an electronic connection in the carrier infrastructure must be physically established before the intercommunication between a mobile device and a link server device can take place. The physical electronic connection through a switch circuit is generally measured in terms of seconds and paid by the user regardless how much data is actually passed through. One of the key features in the present invention is to use narrowband channel 204 to notify the user of mobile device 106 of the update to the information the user subscribes. It is then entirely up to the user to decide what and when to do with the update. Thus the user is timely informed of any updates without incurring uncontrollable cost till the user decides to fetch the updates through wideband channel 206.

Figure 3:
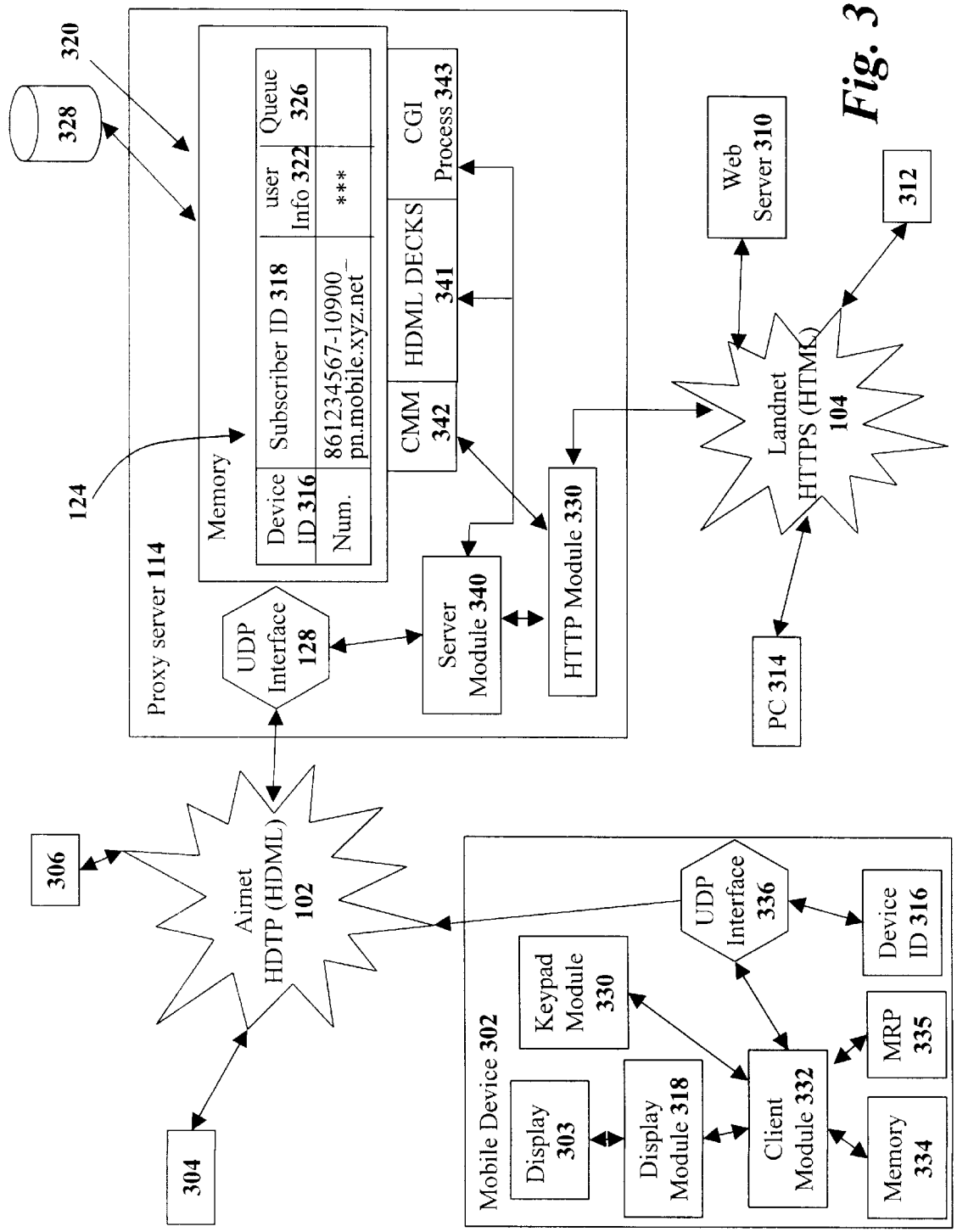
FIG. 3 shows functional block diagrams in a mobile device and a link server device according to one embodiment.

Prior to describing one embodiment of the present invention that uses the well known short message service center (SMSC), it is necessary to refer to FIG. 3 that shows functional block diagrams in a mobile device and a link server device. Referenced by 302, 304 and 306 are three representatives of a plurality of the mobile devices coupled to airnet 102, similarly referenced by 310, 312 and 314 are three representatives of a plurality of landline devices coupled to landnet 104. Link server device 114 couples airnet 102 to landnet 104, therefore any mobile devices can communicate with any of the landline devices via airnet 102 through proxy server 114 to landnet 104. It is understood to those skilled in the art that the mobile devices may be the one 106 shown in FIG. 1. To facilitate the description of the present invention, the internal block diagrams of mobile device 302 and link server device 114 are respectively illustrated. Other processes and hardware are known to those skilled in the art and are not illustrated in detail in the figure for clarity.

Each of the mobile devices, such as 302, is assigned a device ID 316. Device ID 316 can be a phone number of the device or a combination of an IP address and a port number, for example: 204.163.165.132:01905 where 204.163.165.132 is the IP address and 01905 is the port number. The device ID 316 is further associated with a subscriber ID 318 authorized by a carrier in server device 114 as part of the procedures to activate a subscriber account 320 for mobile device 302. Subscriber ID 318 may take the form of, for example, 861234567-10900_pn.mobile.att.net by AT&T Wireless Service, it is a unique identification to mobile device 302. In other words, each of mobile devices 302, 304 and 306 has a unique device ID that corresponds to a respective user account in server device 114. The following description is focused on mobile device 302 and associated account 320, it will be appreciated by those skilled in the art that the description is equally applied to a plurality of the mobile devices in communication simultaneously with server device 114.

The subscriber account 320, indexed by the device ID 316, is a data structure comprising the subscriber information such as a subscriber ID 318, user info 322 and notification queue list 326. User info 322 may include the account configuration and other account related information, such as username, bookmarks, device version and date. In addition, user info 322 may include authorization information such as password, the state of a shared secret key and other information used to authenticate transactions between a mobile device and link server device 114. Notification queue list 326 is used to keep updated status of notifications received and then forwarded to mobile device 302 and is described in detail below.

It can be appreciated that when server device 114 provides services to a number of mobile devices, there will be the same number of such accounts, preferably kept in a database server 328, each of the accounts designated respectively to one of the mobile devices. The URL to access the database may take the form of, for example, www.att.com/Pocketnet, which indicates that the airnet 102 is operated by AT&T wireless service.

As described above, the compiled and linked processes of the present invention are stored in a memory as the client module 332 in the client device 302. Similarly a corresponding compiled and linked processes of the present invention are loaded in a memory as the server module 340 in server device 114. Message receiving port or MRP 335, similar to a pager, is provided to receive messages from a carrier through the narrowband channel. The data communication through the wideband channel between client device 302 and server device 114 is conducted between client module 332 and server module 320 via a pair of User Datagram Protocol (UDP) interfaces 336 and 324 in each device, respectively. When the user of client device 302 presses a predetermined key thereon to interact with server device 114, for example, to fetch price information on a particular stock, client module 332 sends a corresponding request, preferably in form of the HDML deck to the UDP interface 336 which further transmits the request to the counterpart UDP interface 324 in server device 114. The request is processed by server device 114 and may result in a further connection to another server device 310 or 312 on the Internet if server device 114 does not locally host the stock price information. Nevertheless the stock price information is eventually packed into one or more cards in an HDML deck at 340. The HDML deck is sent back by server module 320 to client device 302 through UDP interfaces 336 and 324. With the received HDML deck, preferably cached in client device 302, the client module displays the card or cards on the display screen of the client device 302.

Figure 4:
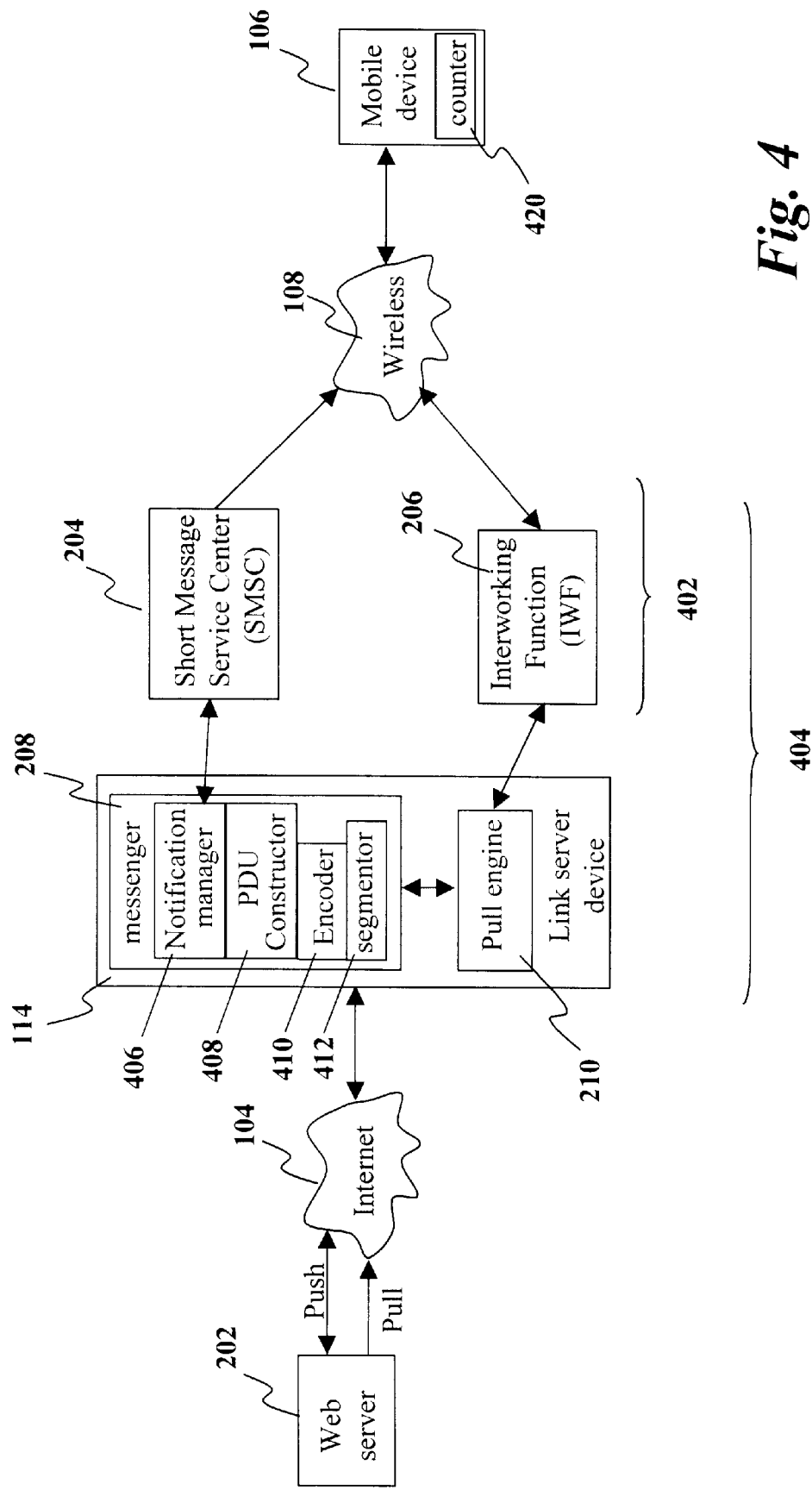
FIG. 4 shows a block diagram illustrating processes in the disclosed system using short message service center (SMSC) according to one embodiment of the present invention.

Referring now to FIG. 4, there is shown a block diagram illustrating processes in the disclosed system using short message service (SMS) according to one embodiment. FIG. 4 shall be understood in conjunction with the rest of figures. Web server device 202 is one of Web servers 112 on the global Internet and provides information accessible by other devices. Many Web servers, such as www.NewsAlert.com, on the Internet provide customized information to those who register for such service. As part of the registration process with a particular Web server, the subscriber ID of the mobile device is recorded. The recordation of the subscriber ID enables the Web service provider or the Web server, to notify any changes made to pages that are particularly subscribed by the user of mobile device 106.

Figure 5:
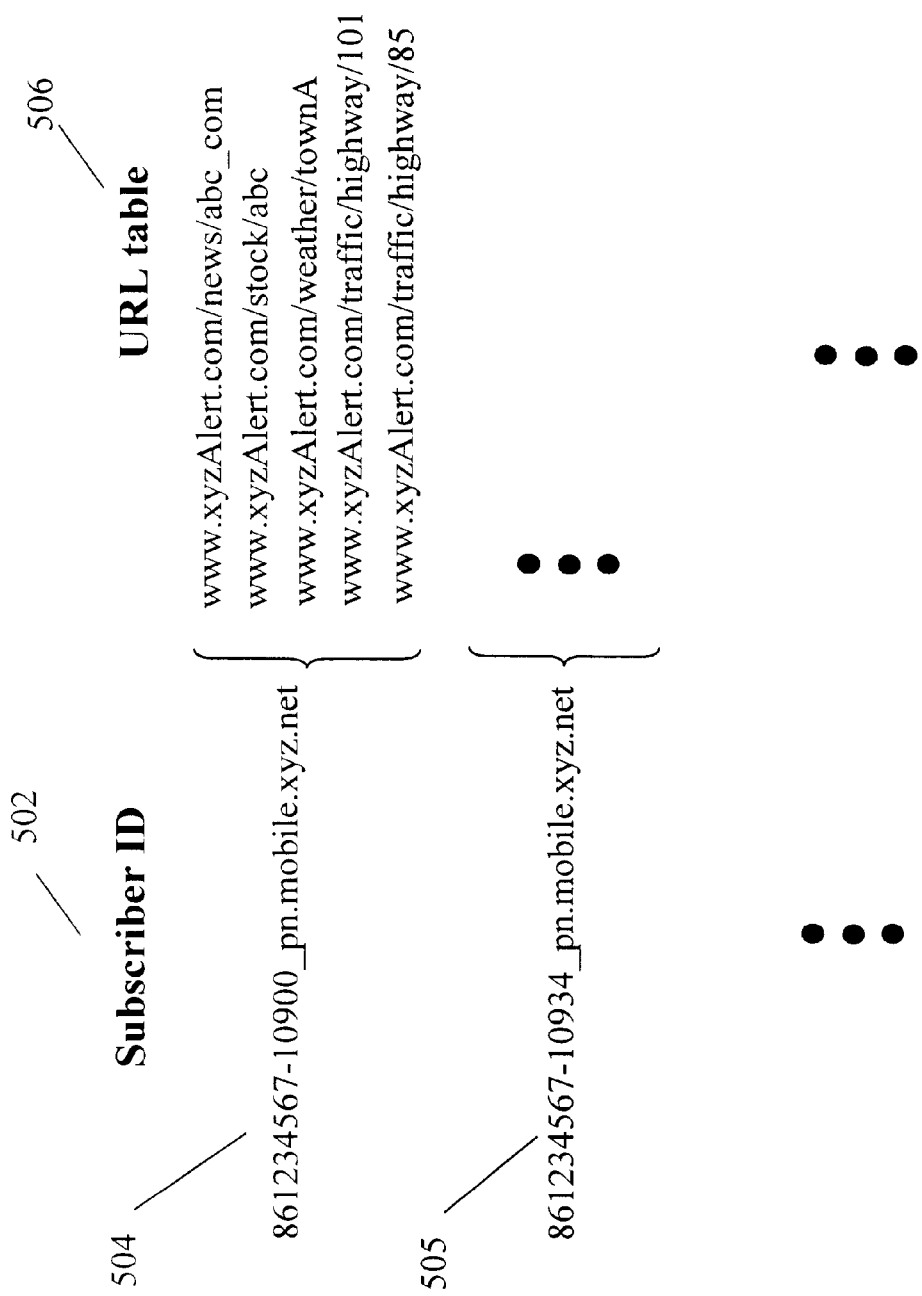
FIG. 5 illustrates a recordation of subscriber IDs and associated URLs in a Web server.

FIG. 5 illustrates a typical table maintained in a Web server device, in which subscriber ID list 502 maintains a list of subscriber IDs of the mobile devices through which the users desire to fetch information from the Web server and be informed of any changes to the particular pages. As shown, a user subscribes to news information provided by www.xyzAlert.com and subscriber ID 504, 861234567-10900_pn.mobile.xyz.net, of the user's mobile device is therefore maintained in subscriber ID list 502. For desired information, such as news about a company named ABC Corp, stock price thereof, weather information in town A and traffic information, particularly on route 101 or 85, each is provided by a page in a hierarchical pages of information tree and respectively identified by a URL:

News—www.xyzAlert.com/news/abc com
Stock—www.xyzAlert.com/stock/abc
Weather in Town A—www.xyzAlert.com/weather/townA
Traffic on 101—www.xyzAlert.com/traffic/highway/101
Traffic on 85—www.xyzAlert.com/traffic/highway/85

The URLs representing the information subscribed by the user are grouped and maintained in URL table 506. It can be appreciated that subscriber ID list 502 generally maintains a plurality of subscriber IDs, each corresponding to one mobile device, typically one user thereof. Similarly, URL table 506 maintains a plurality of groups of URLs, each group corresponding to one mobile device and comprising a list of URLs representing information subscribed by a user thereof. When the information service provider at the Web server updates information in certain pages, for example, a press release from ABC Company is loaded into News, URL table 506 is examined to see if any URLs matches the news and meanwhile the corresponding subscriber IDs in subscriber ID list 502 is taken out to sequentially format a notification to the subscribers that the subscribed news has been updated.

Returning to FIG. 4, according to one embodiment, server device 202 comprises a module developed with a library called UP.SDK provided by Unwired Planet, Inc. located at 390 Bridge Parkway, Redwood Shores, Calif. 94065. The module causes server device 202 to send a notification respectively to corresponding mobile devices that subscribe to certain information that have been updated. It should be understood that the module using UP.SDK is not a requirement to implement the disclosed system, there are many utilities commercially available to automatically send a message or notification to another party. One of the many utilities is the electronic mail (email) system either embedded in an operating system such as UNIX or as an application such as outlook in Microsoft Office. With a list of email addresses similar to the subscriber IDs, an email system can be set to automatically send out a message (notification) to a pre-defined list of users via landnet 104. Nevertheless, the module using UP.SDK from Unwired Planet, Inc. makes the present invention work more efficiently as the engine uses an HTTP-based protocol called UPNOTIFYP specifically designed for the purpose of notifying affected subscribers of the updated information.

As described above, the notification comprises a subscriber ID and an address including one or more URLs indicating those pages whose contents have been updated. To get a user's attention, the notification further comprises an action type. The action type indicates a preference to inform the user of the updates. According to one embodiment of the present invention, the notification is, preferably, in the MIME message format that is used by HTTP to encapsulate data from a server, wherein MIME stands for Multipurpose Internet Mail Extensions. Typically MIME has a standard facility for representing many pieces of data in a single message. The action type is thus represented, in one embodiment, by one of the following:

application/x-up-alert;

application/x-up-cacheop;

multipart/mixed;

where application/x-up-alert will cause the client module in client device 106, for example, to produce an audible sound to make the user of client device 106 aware of the update, application/x-up-cacheop will cause the client module to invalidate the local cached copy of the page that has been updated at server device 202 and multipart/mixed, referred to as a digest, can cause the client module to do the both or react otherwise as specifically required. One of the specific action types in a multipart/mixed format is text/x-hdml or application/x-hdmlc, which, when used with other action type, would cause to prompt a screen display coded in HDML as a cached display card as follows:

```
<HDML version=2.0>

<DISPLAY>

New Emails Arrived.

</DISPLAY>

</HDML>
```

The above code displays a message "New Emails Arrived" when a notification with such specific action type is received. It can be appreciated by those skilled in the art that more or other action types may be added and further it is understood that the notification in the MIME message format is not a necessary requirement to implement the present invention. It is, however, a conventional format that can be efficiently transportable in HTTP primarily used in the Internet.

It is understood that server device 202 may serve a large number of client devices that communicate therewith via different link server devices. Web server device 202 sends out the notification sequentially to affected subscribers via link server device 114. Link server device 114 is identified by a portion of the subscriber ID, for example, pn.mobile.xyz.net, which identifies which link server device on the Internet is supposed to receive the notification.

Upon receiving the notification, server module 340 in link server device 114 starts a verification process to ensure that the received notification is indeed intended to one of the mobile devices that link server device 114 serves by comparing the subscriber ID in the received notification with user account list 320 maintained therein. If the subscriber ID matches one of the subscriber IDs in user account list 320, the notification is accepted.

One of the key functions that messenger 208 performs is to assign an identification to the received notification. The identification to each received notification permits messenger 208 to ensure that all notifications will be eventually delivered. To be more specific, upon receiving the notifications, messenger 208 assigns a tractable sequence identification to each of the notifications and queues them in queue list 326. For every confirmed delivered notification, messenger 208 updates queue list 326 by, for example, stamping a confirmation thereto or simply removing the confirmed delivered notification from queue list 326, thus knowing exactly how many notifications have not been successfully delivered. In another embodiment, messenger 208 queues successively received notifications in queue list 326 and releases the queued notifications to pull engine 210 when a communication session between link server device 114 and client device 106 is established via IWF 206. All the queued notifications are then forwarded to client device 106 via the wideband channel.

Figure 6:
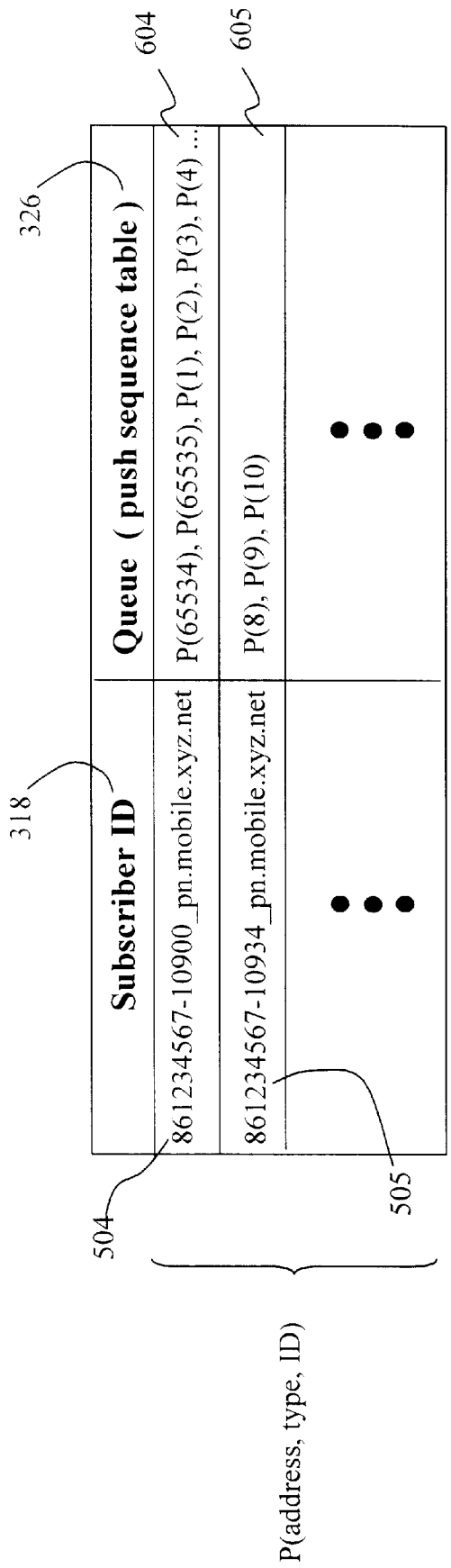
FIG. 6 illustrates a queue list with entries of notifications assigned with a notification sequence number, each corresponding to a subscriber ID.

According to one embodiment, the tractable sequence identification is a sequence of monotonically and evenly increased sequence numbers in the range of (0, 65535) and represented by a 16-bit digit. FIG. 6 demonstrates queue list 326 corresponding to subscriber ID 318. After notification P(address, type, ID) is verified, namely the ID therein is matched to one of user account list 320 or subscriber ID 318, the notification is assigned with a numeral accordingly. For example, subscriber ID 861234567-10934_pn.mobile.xyz.net 505 has 3 queued notifications, P(address$_x$, type, ID, 8), P(address$_y$, type, ID, 9) and P(address$_z$, type, ID, 10), waiting for being delivered, wherein the last item, i.e. 8, 9, and 10, is the respective notification sequence number and address$_x$, address$_y$ and address$_z$ identify respectively three different updated pages. It should be noted the action types in this example are identical but they can be different depending on how the user's account or preference is set up. The last sequence number that is used for the notification is 10 provided P(address$_z$, type, ID, 10) was received after P(address$_y$, type, ID, 9) and P(address$_x$, type, ID, 8) were received. Hence the sequence number that is assigned to the newly arrived P(address, type, ID) will be 11, or more appropriately P(address, type, ID, 11) that is queued into queue list 326 corresponding to subscriber ID 861234567-10934_pn.mobile.xyz.net 505.

It should be understood that the sequence number is assigned not necessarily based on the last entry to queue list 326. Notification manager 406 in messenger 208 is responsible for assigning a sequence number to a received notification. Notification manager 406 may comprise a sequence number generator generating a sequence of consecutive numbers. So at anytime, notification manager 406 can be consulted for the last sequence number it has assigned.

It is described above that queue list 326 can be used to keep the undelivered notifications. There are generally several reasons that would cause notifications to be kept in queue list 326. One of the common reasons is that the targeted device, i.e. a client device, is powered off or beyond a carrier service coverage, hence all notifications destined for the device are queued and will be sequentially delivered once the device becomes available (or powered on). As shown in FIG. 6, subscriber ID 861234567-10900_pn.mobile.xyz.net 504 has a sequence of undelivered notifications and further it can be noticed that the sequence numbers have been circularly used within a predefined range. It can be noted that numeral "0" is used as a nil sequence number therefore not used for the notification after P(address, type, ID, 65535) according to one embodiment.

Returning back to FIG. 4, the accepted notification is then processed in a PDU constructor 408 to construct what is called PUSH PDU, wherein PDU stands for Protocol Data Unit and is a preferable data format exchanged between a link server device and a mobile device via a wireless data network.

As is known to those skilled in the art, each PDU comprises a header and a body. Depending on the purpose of a PDU, the header includes destination information, either a client address or a server address. The body carries mainly, in this case, the contents of the notification from the server device 202. Moreover, there are functional types for each PDU, such as an Acknowledge PDU for acknowledging the receipt of a message. The PUSH PDU means that the PDU is pushed out by a link server device to a mobile device that did not request the PDU. The functional type is generally in the body, preferably the first byte thereof. Additional details on the data format as well as processing in the mobile device are contained in commonly assigned U.S. patent application Ser. No. 08/977,572 entitled "Pushing and Pulling Data in Networks" by Stephen S. Boyle, et al, which is incorporated herein by reference in its entirety. The PUSH PDU essentially includes all the necessary information in a notification, such as the subscriber ID, the action type and the affected URLs in additional to the sequence number and auxiliary data information for a PDU format. Depending on the characteristics of Short Message Service Center (SMSC) 204, the PUSH PDU may or may not be encoded into a sequence of message fragments before forwarded to Short Message Service Center (SMSC) 204.

SMSC 204 is a dedicated system used for delivering short message in the carrier infrastructure. A short message comprises a text of up to a predefined length, for example, 160 characters, which is sent to a mobile phone whether or not engaged in a call or powered on or off. The effect of this is to give the mobile phone the facilities of an alphanumeric pager, but with confirmed delivery of messages. In other words, SMSC 204 holds undelivered messages, and resends them at intervals until receipt is confirmed. This used to be a predominantly European digital network standard that allows portability of phones across network boundaries and now supported in many types of wireless networks in US and other countries.

According to one embodiment of the present invention, SMSC 204 carries short messages of up to 160 alphanumeric characters although there are a few new SMSCs that transport binary data as well, in which case 0's and 1's are treated as individual characters subject to the maximum length. In the case that SMSC can only carry alphanumeric characters, an encoder 410 converts a binary data represented PUSH PDU into alphanumeric characters using a well known Base64 encoding scheme. The final section of this specification entitled "Coding and decoding—Base64" explains in detail the encoding scheme and is incorporated herein by reference in its entirety.

For example, a binary data representation is expressed as:

110110001011010100000101

The corresponding alphanumeric representation thereof using Base64 is expressed as:

sLUF

The encoded PDU, visually meaningless alphanumeric characters, is then transmitted by SMSC 204 to the mobile device identified by the subscriber ID therein.

Figure 7:
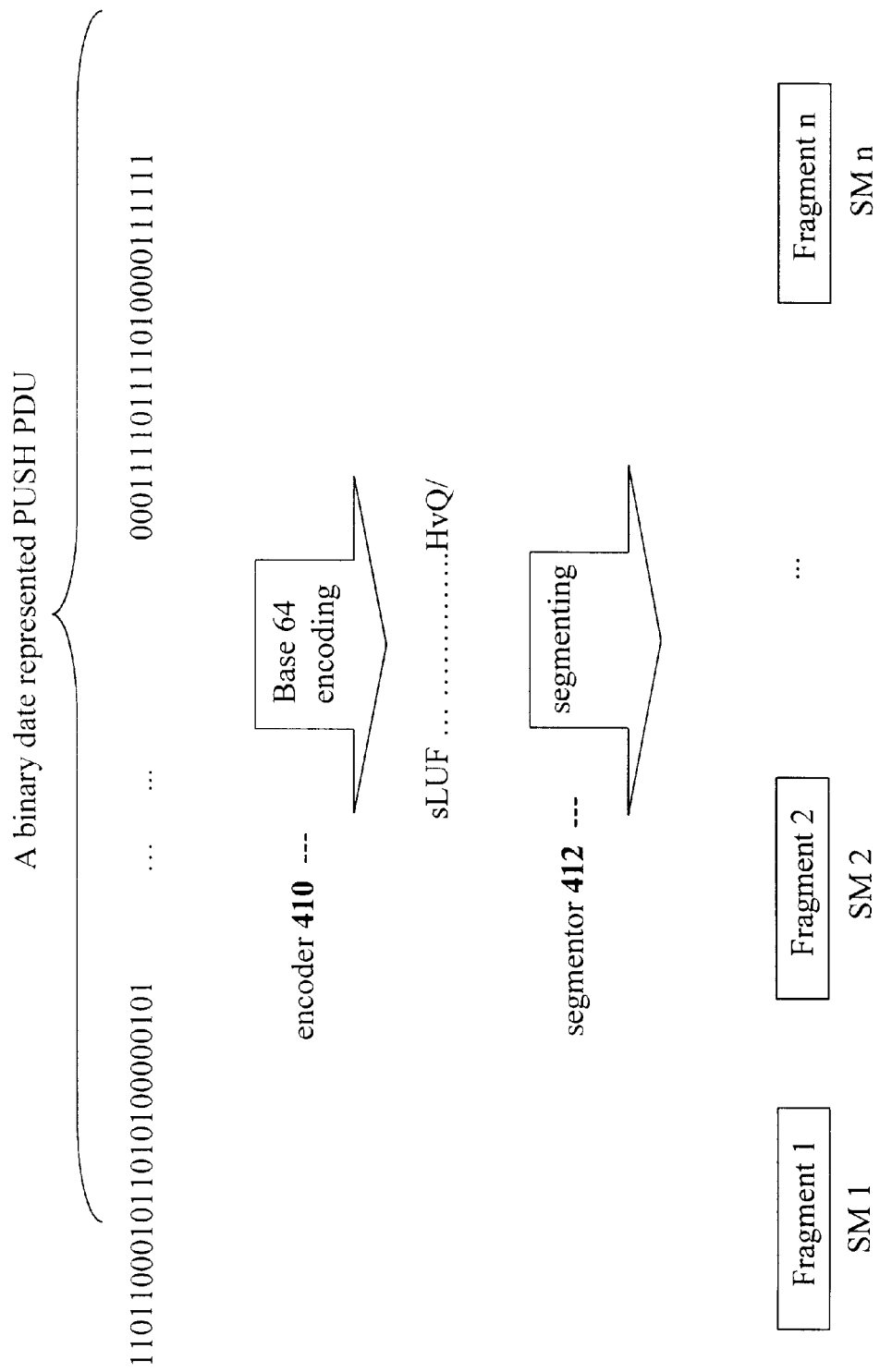
FIG. 7 illustrates a push message encoded in Base64 in a PDU.

In reality, the PUSH PDU representing the notification from server device 202, after encoded, may exceed the limit of the short message transportable by SMSC 204. The encoded PUSH PDU is then segmented by a segmentor 412 into a plurality of fragments, each representing a portion of the encoded PUSH PDU. FIG. 7 illustrates the process of encoding a binary data represented PUSH PDU into alphanumeric characters and then segmenting encoded PUSH PDU into a sequence of fragments, each being treated as a short message with a length no more than the maximum length allowed in SMSC 204 and sent out sequentially by SMSC 204. To maintain the integrity of the encoded PDU, each fragment has a consecutive sequence number, preferably monotonically increased, which permits client device 106 to reconstruct the encoded PDU upon receiving all the fragments. Similarly, in the case that SMSC 204 can carry both alphanumeric and binary data, the binary data represented PUSH PDU is directly segmented into a number of the fragments without the need to be encoded into the alphanumeric characters.

SMSC 204 receives the fragments from link server device 104 and sequentially and respectively transmits the fragments to corresponding mobile device identified by the device ID. As described above, regardless of whether the mobile device is switched on or off, for every message SMSC 204 sends, messenger 208 receives an acknowledgement that indicates if the message has been transmitted or is still buffered in SMSC 204. In other words, the messages are retained in SMSC 204 and periodically transmitted until the mobile device receives all the messages to reconstruct the PUSH PDU.

Upon receiving one or a sequence of the short messages, client module 332 in mobile device 302 reconstructs the PUSH PDU by decoding the encoded PDU received from SMSC 204. The decoding process is the reversed process of the encoding, namely to transform the alphanumeric characters to the original binary-based PUSH PDU according to the same encoding scheme, such as Base64. With the PUSH PDU in a memory of mobile device 302, client module 332 proceeds to extract the action type first. According to the action type, client module 332 causes the microcontroller in mobile device 302 to respond accordingly, for example, to produce an audible sound if the action type is application/x-up-alert or multipart/mixed containing application/x-up-alert. When the audible sound is noticed, the user of mobile device 302 may navigate to the indicated page that is entitled by the title in the reconstructed PUSH PDU. If the user proceeds with the page and the action type is, for example, application/x-up-cacheop, the cached content is no longer valid and the content must be fetched before it can be displayed to maintain cache coherency.

To fetch the updated content, mobile device 302 must first send a request to establish a communication session with the link server device 114 via IWF 206. The request to establish the connection with link server device 114 comprises the device ID of mobile device and the URL provided in the reconstructed PUSH PDU. Upon receiving the request, link server device 114 proceeds with an authentication process by comparing the device ID in the received request with the device ID in device ID list 316. If there is a match between the device IDs, server device 114 authenticates mobile device 106 and further sends the request with the corresponding subscriber ID to server device 202 to establish a connection between server device 202 and link server device 114 based on the URL. Once the connection is established, the updated information is fetched through Internet 104 using HTTP to link server device 210 that further forwards the updated information to mobile device 302.

As described before, there are occasions that a few notifications may not be delivered successfully to the mobile device 106 and the undelivered notifications are then queued in queue list 326. To ensure the undelivered notifications are eventually received in mobile device 106, pull engine 210 contacts messenger 208 every time the user of mobile device 106 initiates the connection through the wideband channel via IWF 206. When the updated information is being fetched to mobile device 106, the queued notifications, if there are any in queue list 326, are also fetched by pull engine 210 and forwarded through the wideband channel to mobile device 106. There is, however, a possibility that the queued notifications may be forwarded by SMSC 204 to mobile device 106 as well. To avoid possible duplications of the notifications from two different channels, mobile device 106 includes a register 420 to keep track of the notifications received. To be more specific, for example, there are 3 notifications, P(address$_x$, type, ID, 9), P(address$_y$, type, ID, 10) and P(address$_z$, type, ID, 11) that are not delivered successfully to mobile device 106 for some reason and the mobile device 106 has received notifications with the notification sequence number up to 8, therefore the register=8 indicates that 8 is the last notification received in the mobile device 106. When a connection between link server device 114 and mobile device 106 is subsequently established, the notification sequence number 8 recorded in register 420 is sent to pull engine 210. By examining the notification sequence number (=8) from mobile device 106, pull engine can determine if there are any undelivered notifications in the queue list 326 by comparing the received notification sequence number with notification manager 406 that in fact has issued a notification sequence number being 11. In other words, if the two sequence numbers are not matched, there are some undelivered notifications in queue list 326 and pull engine 210 proceeds to fetch those undelivered notifications and sends them to mobile device 106. Register 420 in mobile device is updated for each notification received. It now can be appreciated that register 420 also prevents duplicated notifications from SMSC 204 by examining the sequence numbers. When register 420 shows that all notifications for mobile device 106 received by link server device 114 have been delivered, mobile device 106 rejects the late coming notifications from SMSC 204 to avoid possible duplications.

Figure 8A:
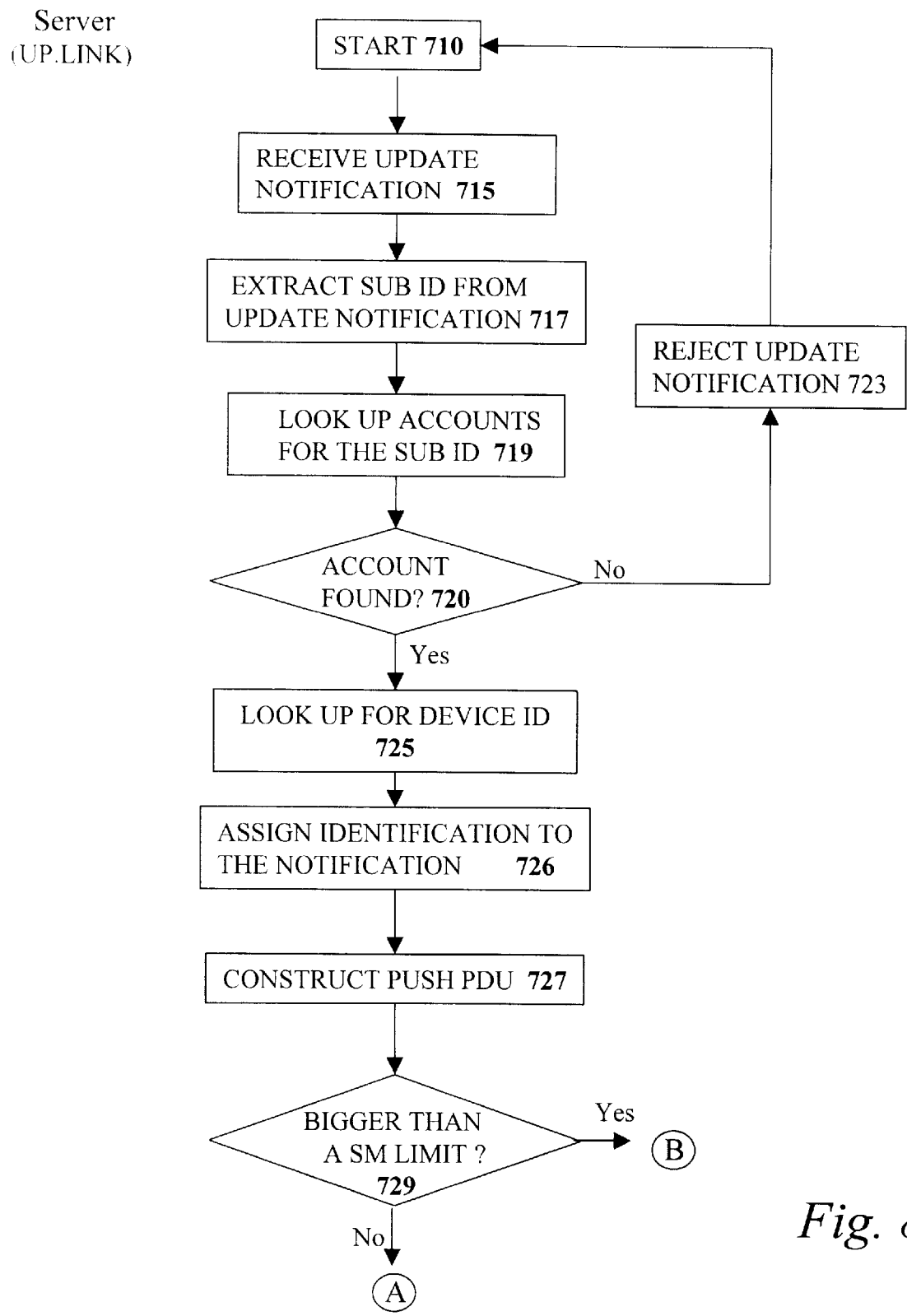
FIGS. 8A to 8F illustrate a process flowchart that describes the operations and procedures of the link infrastructure and the mobile device (client device) according to one embodiment of the present invention.

FIGS. 8A to 8F illustrate a process flowchart that describes the operations of the link infrastructure and the mobile device (client device) according to one embodiment. Referring to FIG. 8A, the link server device in the link infrastructure receives at 715 an update notification from a web server that holds the updated information. The link server device then extracts a subscriber ID from the update notification at 717. Using the extracted subscriber ID, the link server in the link infrastructure attempts to look up a matching subscriber account at 719. If there is no such account, the update notification is rejected at 723.

After having found a matching subscriber account, a device ID for the subscriber's mobile device is extracted at 725 meanwhile a notification identification is assigned to the received update notification at 726. Then, a PUSH PDU is constructed at 727 from the update notification. As stated before, the transformation from one data format to another, namely to PUSH PDU in one embodiment, is not a necessary requirement to practice the present invention. In the foregoing description, the corresponding message is used to indicate the transformed notification and can be the notification without being transformed, and hence used interchangeably with the notification herein in some occasions. Nevertheless at 729, the newly constructed PUSH PDU is determined if the length thereof is greater than the maximum message length that the message system, such as SMSC, in a carrier infrastructure can deliver.

Figure 8B:
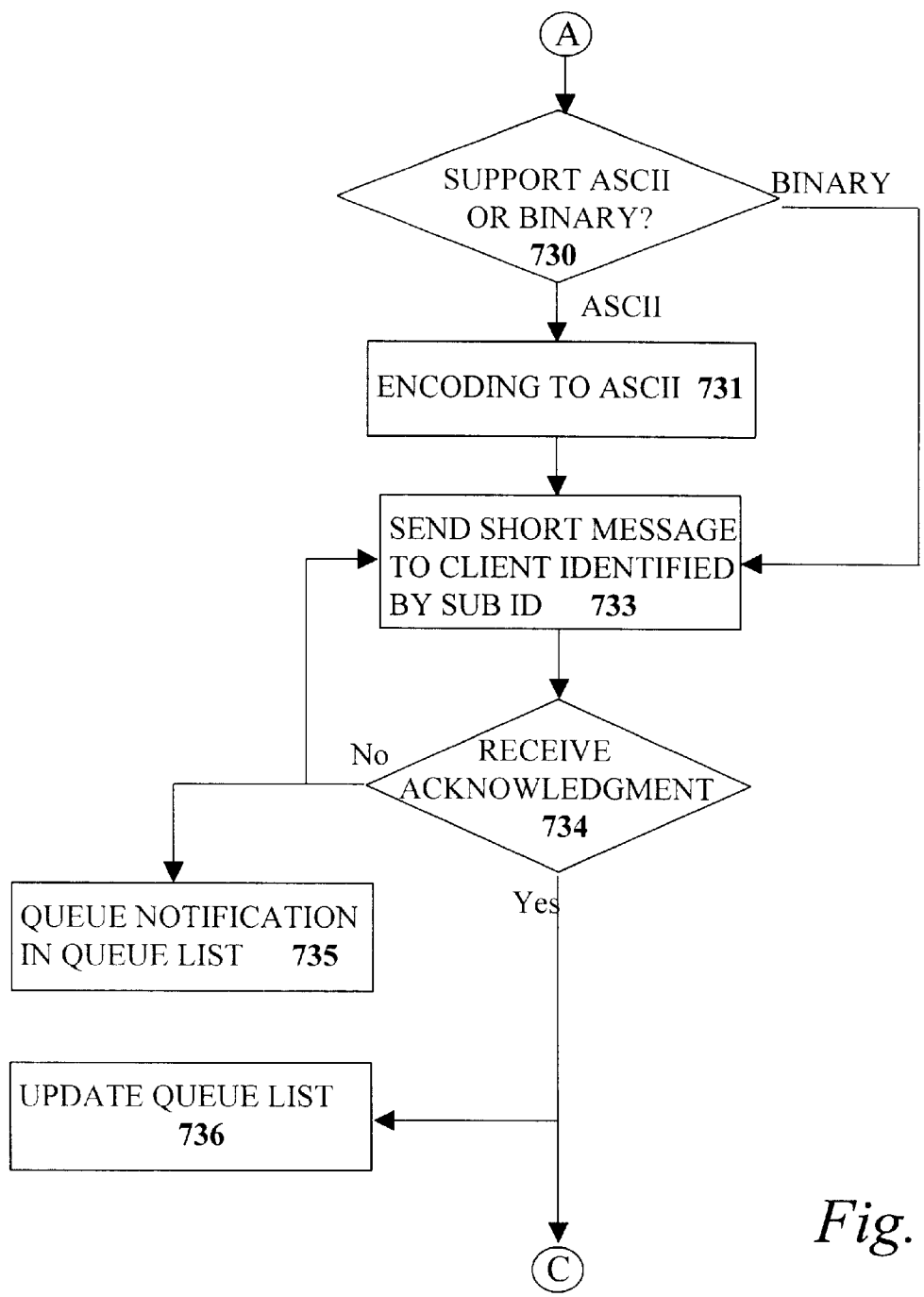

If the PUSH PDU has a length not larger than the maximum message length, then a messenger in the link server device determines if the constructed PUSH PDU needs to be encoded or not depending on the message format the message system supports at 730 in FIG. 8B. If the message system does not support binary message format, then the message is encoded into alphanumeric characters at 731. At 733, the encoded PUSH PDU is sent to the client device identified by the device ID corresponding to the device ID in the update notification. If no acknowledgement is received at 734, namely the "N" direction, the link server asserts that the update notification is not successfully delivered and therefore queues the update notification into a queue list therein at 735. Meanwhile the message system attempts to continue delivering the encoded PUSH PDU. When the encoded PUSH PDU is successfully delivered, the queue list gets updated, preferably, by removing the update notification, corresponding to the just delivered encoded PUSH PDU, out of the queue list at 736. Back to 730 and if the message system does support binary message format, then the encoding procedure is skipped. Similar to what has been described, the rest of processes and procedures through 736 can be readily understood now.

Figure 8C:
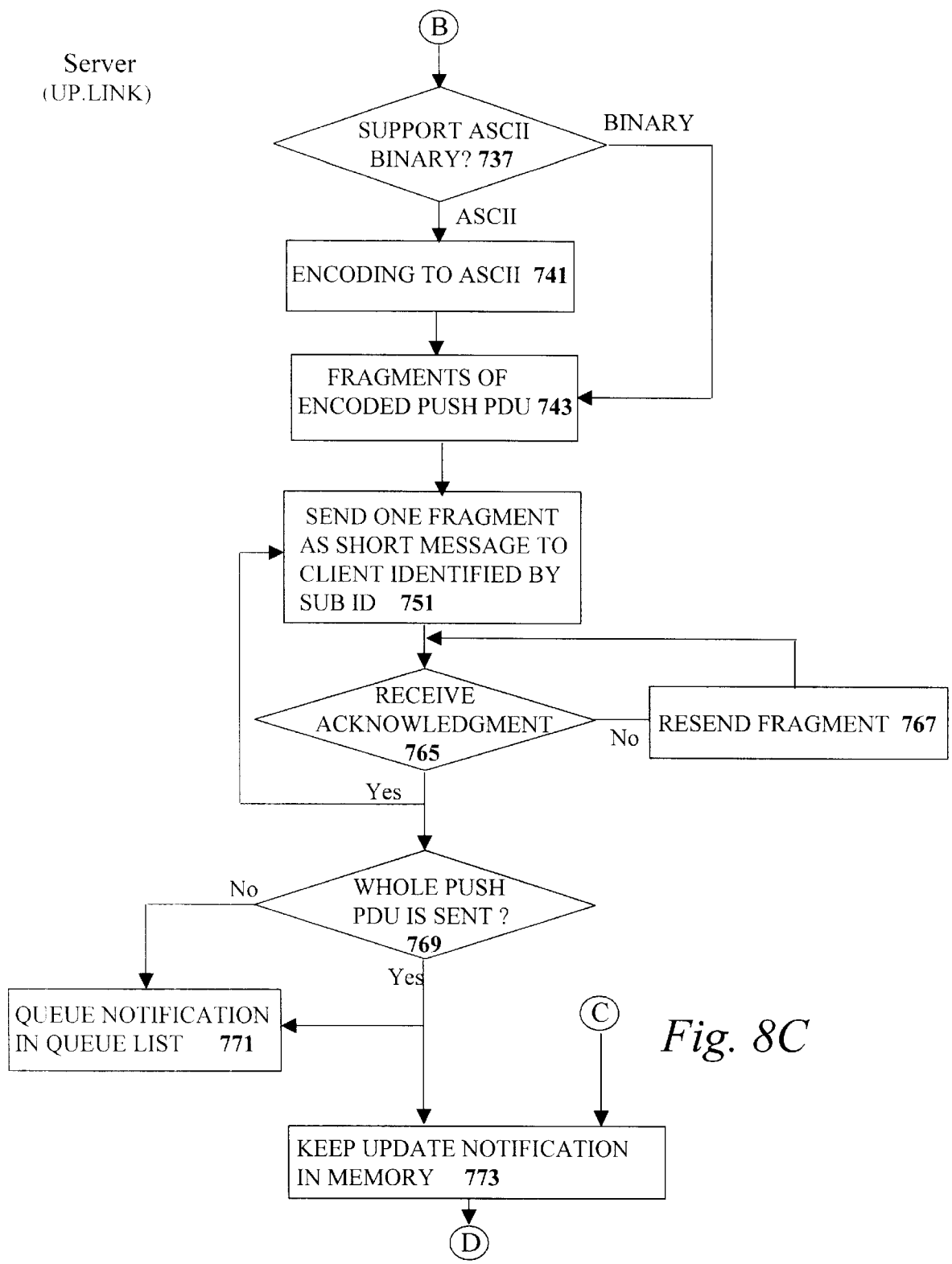

If the constructed PUSH PDU is larger than the maximum message length, then the messenger moves to 737 in FIG. 8C to determine if the message system supports binary message format or textual (alphanumeric) format. If the message system does not support binary message format, then the constructed PUSH PDU is encoded into alphanumeric characters at 741. Then, at 743, the encoded PUSH PDU is segmented into pieces of message fragments, each is assigned a sequence number for the recipient to reassemble the encoded PUSH PDU from individually received message fragments. At 751, message fragments are successively and individually sent to the client device. If no acknowledgement for any of the message fragments is received at 765, then the message system resends the message fragment at 767 until an acknowledgement is received. A timeout (not shown) is preferably defined to prevent the message system from perpetually trying to send the message fragment. At 769, the messenger in the link server device receives a confirmation from the message system in the carrier infrastructure. If the confirmation indicates that the encoded PUSH PDU is not successfully delivered to the client device, the corresponding notification is queued into the queue list for another attempt. If the confirmation is a successful delivery, the status is preferably kept in the messenger for future reference. It should be noted that if the encoded PUSH PDU is tried to deliver more than once, that means the queue list shall have an entry for the corresponding notification. The queue list should be updated accordingly when the delivery confirmation is received. Preferably at 777, all the delivery confirmations are kept in a memory for a certain period for reference when needed.

Figure 8D:
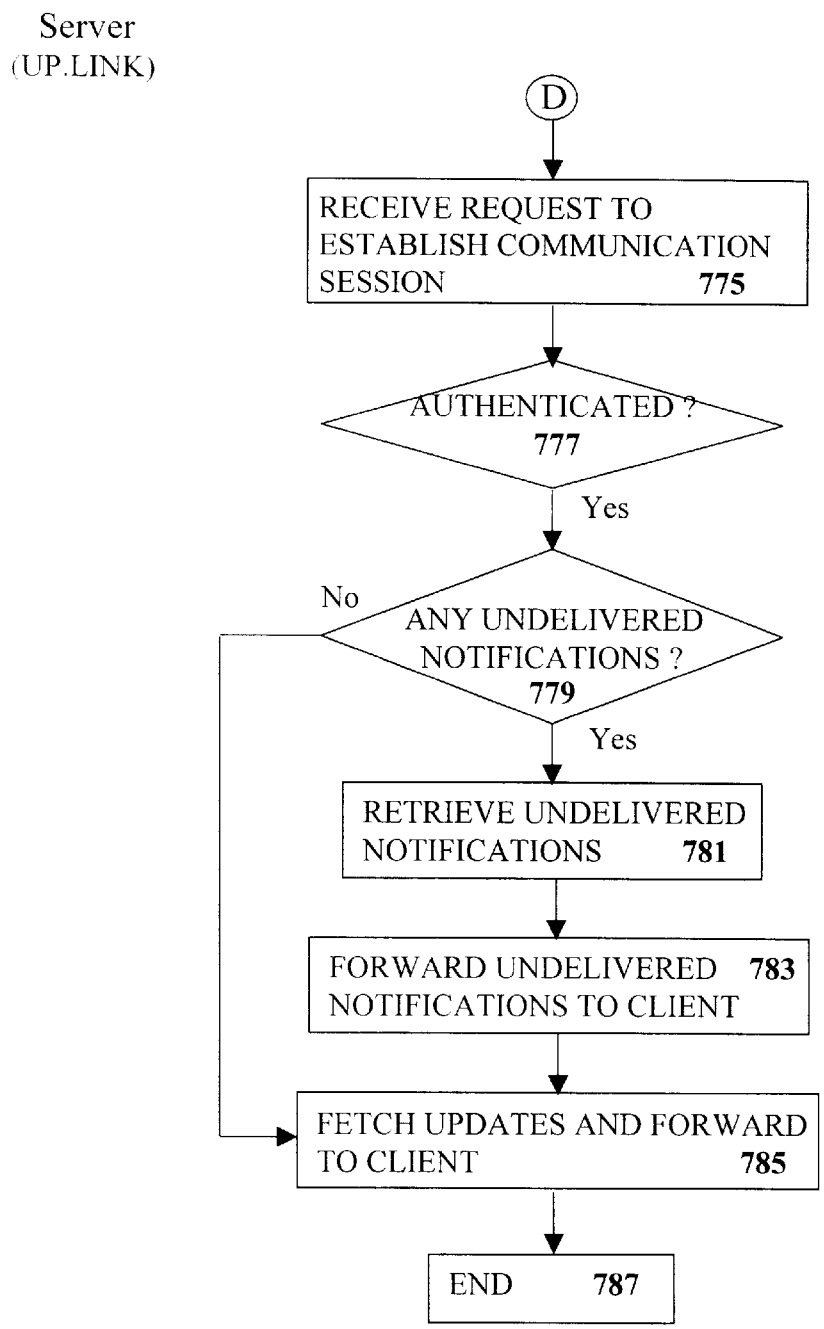
Figure 8E:
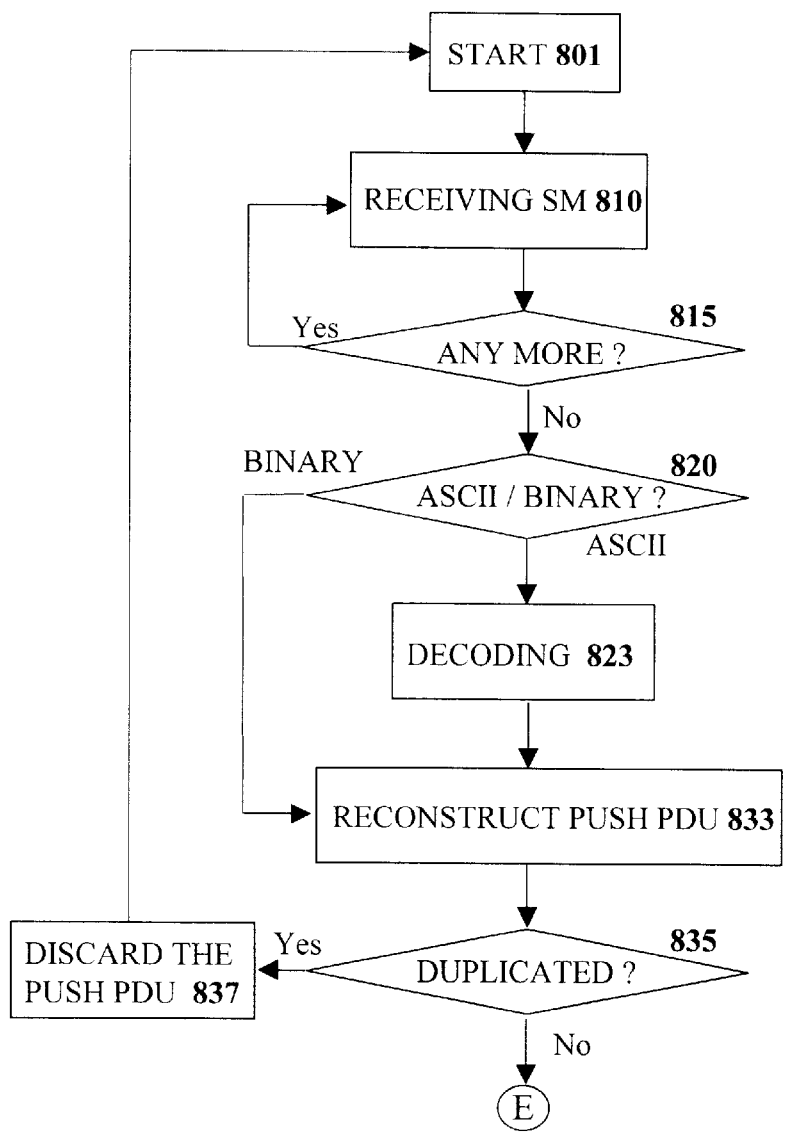
Figure 8F:
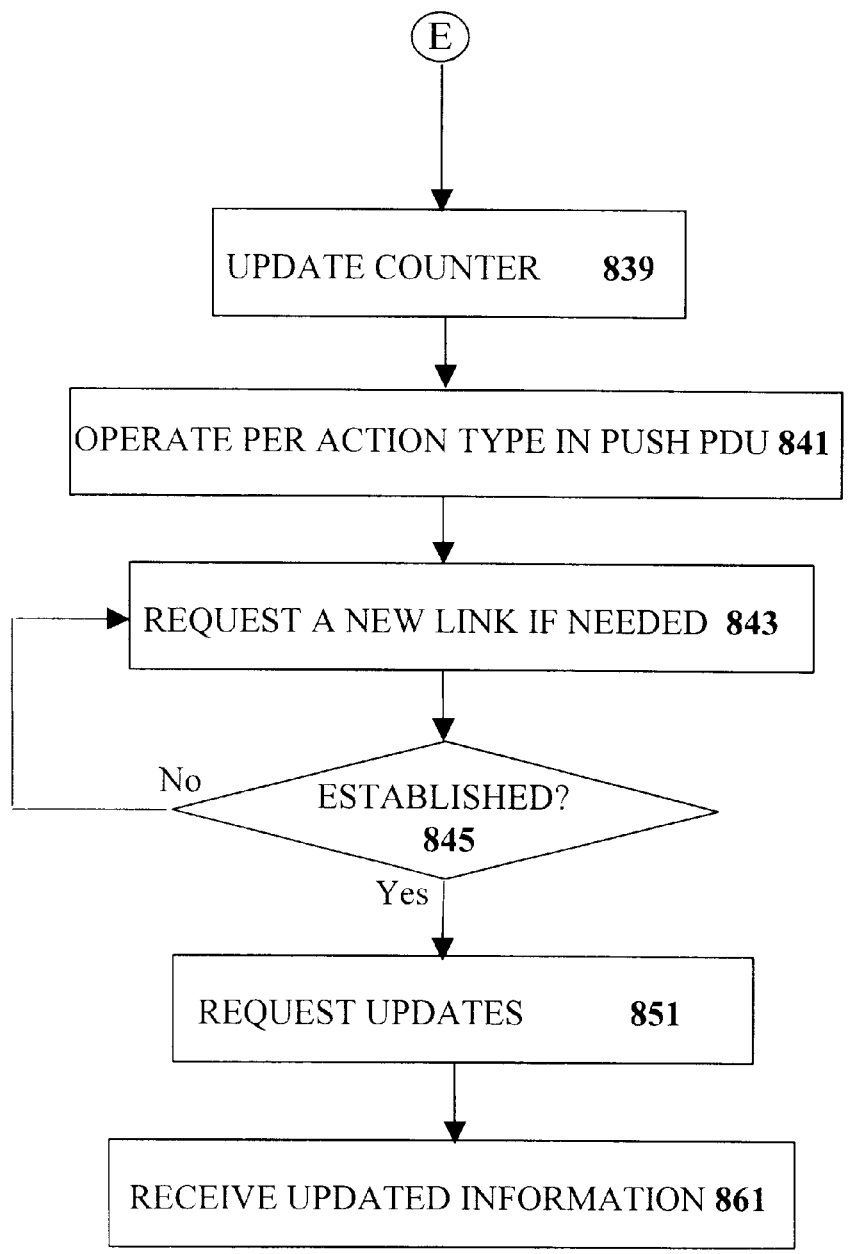

Before continuing on FIG. 8D, referring now to FIGS. 8E and 8F, there are shown corresponding processes and procedures to illustrate how a mobile device reacts to the update messages. At 810, the mobile device receives a small message. If the message has been broken into fragments, then the mobile device will continue to receive additional message fragments. At 820, the mobile device determines if the message is in encoded alphanumeric characters or binary form. If the message is in encoded alphanumeric characters, then the message is decoded back to the binary-based PUSH PDU at 823 according to the same scheme used for encoding. At 833, the binary-based PUSH PDU, either directly from 820 that is for binary format or from 823 that recovers to the binary format, is reconstructed to form a whole PUSH PDU if it comes in as message fragments.

At 835, a register recording the notification identification in the client device examines if the newly received PUSH PDU was actually received before. If there is a matched notification identification in the register, the newly received PUSH PDU is discarded at 837, otherwise the register is updated at 839. At 841, the action type from the PUSH PDU is extracted and causes the client device to react accordingly. When the client device is caused to fetch the updates described in the notification originally sent out from the web server device that holds the updates, the client device initially send a request to establish a communication session with the link device through the wideband channel at 843.

Upon receiving the request at 775 of FIG. 8D, the link device proceeds with an authentication procedure at 777 that includes device ID verification by looking up for the corresponding user account therein. Further if needed, the verification can include a process of creating a session key for the particular session to encrypt messages exchanged between the client device and the link device. It should be noted that the notification, generally piggybacked with the request, now in the link device that takes the URL therein to proceed to fetch the updates identified by the URL from the web server device on the Internet.

At 781, a pull engine in the link device consults with the messenger to determine if there are any undelivered notifications in the queue list. If there are any in the queue list, the pull engine at 783 retrieves the undelivered notifications from the queue list and forwards the notification through the established communication session in the wideband channel, meanwhile the pull engine at 785 fetches the updates from the web server device and forwards the updates to the client device.

Now referring to FIG. 8F, after the mobile device establishes the communication session with the link device at 845, the client device proceeds to request to fetch the updates indicated in the received PUSH PDU at 851. The updated information forwarded from the link device is received at 861.

Coding and Decoding—Base64

Base64 is the encoding scheme defined by Multipurpose Internet Mail Extensions (MIME), and it's designed to be robust to all the transformation that a message can experience in traversing the Internet. It is not defined in MIME RFCs: they adopted this scheme that was specified in RFC 1421, that refers to the PEM (Privacy Enhanced Mail).

Every MIME mailtool can handle it, but, if the attachment is not recognized by the recipient, the message must be saved as a file and decoded afterwards with a decoder not built-in in the mailtool. SONAH recommends as Base64 encoder/decoder Mpack, available for Unix, DOS, Mac and others.

The encoding mechanism, is the following. Proceeding from left to right, the bit string is encoded into characters which are universally representable at all sites, though not necessarily with the same bit patterns (e.g., although the character "E" is represented in an ASCII-based system as hexadecimal 45 and as hexadecimal C5 in an EBCDIC-based system, the local significance of the two representations is equivalent).

A 64-character subset of International Alphabet IA5 is used, enabling 6 bits to be represented per printable character. (The proposed subset of characters is represented identically in IA5 and ASCII.) The character "=" signifies a special processing function used for padding within the printable encoding procedure.

The encoding function's output is delimited into text lines (using local operating system conventions), with each line except the last containing exactly 64 printable characters and the final line containing 64 or fewer printable characters. (This line length is easily printable and is guaranteed to satisfy SMTP's 1000-character transmitted line length limit, wherein SMTP stands for Simple Mail Transfer Protocol and is a method by which computers exchange information that allows computers on the Internet to send and receive Internet email)

The encoding process represents 24-bit groups of input bits as output strings of 4 encoded characters. Proceeding from left to right across a 24-bit input group, each 6-bit group is used as an index into the array of 64 printable characters shown below. The character referenced by the index is placed in the output string. These characters, identified in Table 1, are selected so as to be universally representable, and the set excludes characters with particular significance to SMTP (e.g., ".", "", "").

Special processing is performed if fewer than 24 bits are available in an input group at the end of a message. A full encoding quantum is always completed at the end of a message. When fewer than 24 input bits are available in an input group, zero bits are added (on the right) to form an integral number of 6-bit groups.

| Value | Encoding |
|---|---|
| 0 | A |
| 1 | B |
| 2 | C |
| 3 | D |
| 4 | E |
| 5 | F |
| 6 | G |
| 7 | H |
| 8 | I |
| 9 | J |
| 10 | K |
| 11 | L |
| 12 | M |
| 13 | N |
| 14 | O |
| 15 | P |
| 16 | Q |
| 17 | R |
| 18 | S |
| 19 | T |
| 20 | U |
| 21 | V |
| 22 | W |
| 23 | X |
| 24 | Y |
| 25 | Z |
| 26 | a |
| 27 | b |
| 28 | c |
| 29 | d |
| 30 | e |
| 31 | f |
| 32 | g |
| 33 | h |
| 34 | i |
| 35 | j |
| 36 | k |
| 37 | l |
| 38 | m |
| 39 | n |
| 40 | o |
| 41 | p |
| 42 | q |
| 43 | r |
| 44 | s |
| 45 | t |
| 46 | u |
| 47 | v |
| 48 | w |
| 49 | x |
| 50 | y |
| 51 | z |
| 52 | 0 |
| 53 | 1 |
| 54 | 2 |
| 55 | 3 |
| 56 | 4 |
| 57 | 5 |
| 58 | 6 |
| 59 | 7 |
| 60 | 8 |
| 61 | 9 |
| 62 | + |
| 63 | / |
| (pad) | = |

The present invention has been described in sufficient detail with a certain degree of particularity. It is understood to those skilled in the art that the present disclosure of embodiments has been made by way of example only and that numerous changes in the arrangement and combination of parts as well as steps may be resorted without departing from the spirit and scope of the invention as claimed. Accordingly, the scope of the present invention is defined by the appended claims rather than the forgoing description of embodiments.

We claim:

1. A method of integrating a narrowband channel and a wideband channel used to communicate between a plurality of client devices and a link infrastructure, said method comprising:

maintaining a user account associated with a client device in said link infrastructure;

receiving a notification in said link infrastructure from a web server when specific information is updated at said web server, said specific information subscribed by said client device and identified by said notification, wherein said notification comprises a subscriber identifier identifying said user account;

extracting a client device identifier from said user account using said subscriber identifier in said notification; and sending a corresponding message including information from said notification, from said link infrastructure to said client device identified by said client device identifier via said narrowband channel;

receiving a request from said client device to establish a communication session with a link device in said link infrastructure via said wideband channel;

authenticating said client device;

forwarding said updated specific information from said link device to said client device via said wideband channel.

2. The method as recited in claim 1, wherein said notification further comprises an action type; said action type causing said client device to react to said notification upon said client receiving said corresponding message.

3. The method as recited in claim 1, said method further comprising:

invalidating a cached copy of said specific information in said client device such that said updated specific information has to be fetched when said cached copy is accessed.

4. The method as recited in claim 3, wherein invalidating said cached copy of said specific information comprises:

displaying a title identifying said specific information updated at said web server.

5. The method as recited in claim 1, said method comprising:

fetching said updated specific information to said link device from said web server.

6. The method as recited in claim 2, said method further comprising generating an alert message with respect to said action type to cause a user of said client to be aware of said specific information updated at said server.

7. The method as recited in claim 6, wherein said alert message is an audible sound generated in said client device with respect to said action type in said notification from said web server.

8. The method as recited in claim 7, said method further comprising:

displaying a title identifying said specific information updated at said web server when said user proceeds with said audible sound.

9. The method as recited in claim 1, wherein said notification comprises an address identifying said specific information updated at said web server.

10. The method as recited in claim 9, wherein said notification further comprises:

a title entitling said updated specific information at said web server.

11. The method as recited in claim 9, wherein said address of said updated information comprises at least a Uniform Resource Locator providing linking information to said specific information updated at said web server.

12. The method as recited in claim 1, wherein said link infrastructure comprises:

a messenger comprising a notification manager, said notification manager assigning a notification identification to said notification upon receiving said notification from said web server and wherein said corresponding message further comprises said notification identification.

13. The method as recited in claim 12, wherein method comprises:

updating a counter in said client device with respect to said notification identification upon receiving said corresponding message.

14. The method as claimed in claim 13, said method further comprising:

requesting said updated specific information from said web server according to said received corresponding message.

15. The method as claimed in claim 14, wherein requesting said updated specific information from said web server comprises:

fetching said updated specific information to said link device from said web server.

16. The method as claimed in claim 15 further comprising:

displaying said updated specific information after receiving said updated specific information forwarded from said link device in said link infrastructure.

17. The method as claimed in claim 15, wherein requesting said updated specific information from said server further comprises:

sending to said link device said notification identification recorded in said counter in said client device when said communication session is established between said link device in said link infrastructure and said line device via said wideband channel.

18. The method as claimed in claim 17, said method further comprising:

consulting with said notification manager on said notification identification sent from said client device to determine if said notification identification is the last identification said messenger has assigned; and retrieving queued notifications in a queue list in said notification manager if said notification identification sent from said client device is not the last identification said messenger has assigned.

19. The method as claimed in claim 18 wherein retrieving queued notifications in said queue list in said notification manager comprises:

forwarding said queued notifications retrieved from said queue list to said client device via said wideband channel; and updating said counter in said client device for each of said queued notifications received from said link device.

20. The method as claimed in claim 1, wherein sending said corresponding message including information about said notification comprises:

assigning a notification identification to said notification received in said link infrastructure; and transforming said notification along with said assigned notification identification to said corresponding message transportable in said narrowband channel.

21. The method as claimed in claim 20, wherein said corresponding message is a PUSH PDU.

22. The method as claimed in claim 20, wherein sending said corresponding message including said notification comprises:
   encoding said corresponding message into a format transportable by a message system according to a predefined encoding/decoding scheme if said message system responsible for delivering said corresponding message via said narrowband channel does not directly support said corresponding message.

23. The method as claimed in claim 22, wherein sending said corresponding message including said notification further comprises:
   determining if said encoded corresponding message has a whole length greater than a predefined length limited by said message system; and
   segmenting said encoded corresponding message into a plurality of message fragments when said whole length is greater than said predefined length, each of said plurality of said message fragments having a length less than said predefined length.

24. The method as claimed in claim 23, wherein segmenting said corresponding message into a plurality of message fragments comprises:
   assigning a fragment sequence number, respectively, to each of said plurality of said message fragments.

25. The method as claimed in claim 24, said method further comprising:
   fetching said updated specific information to said link device from said web server.

26. The method as claimed in claim 25, said method further comprising:
   reassembling said plurality of said message fragments into said format based on said fragment sequence number in each of said plurality of said message fragments; and
   decoding said format to recover said corresponding message according to said encoding/decoding scheme.

27. A system for integrating a narrowband channel and a wideband channel between a client device and a communication infrastructure, said system comprising:
   a link infrastructure coupling said client device to a web server containing specific information subscribed by said client device; said link infrastructure comprising
      a proxy server, said proxy server comprising user accounts;
      a pull engine for receiving a notification from said web server when said specific information is updated, said pull engine also for pulling said updated specific information from said web server; and
      a messenger, said messenger communicating with said pull engine, said messenger responsible for transforming said notification from said web server to a corresponding notification message for delivery to said client device across said narrowband channel;
   wherein said pull engine responds to a request from said client device by forwarding said updated specific information to said client device across said wideband channel.

28. The system as claimed in claim 27 wherein said notification comprises an address identifying said updated specific information in said web server.

29. The system as claimed in claim 28 wherein said address comprises
   at least a Uniform Resource Locator providing linking information to said updated specific information using HyperText Transfer Protocol (HTTP).

30. The system as claimed in claim 28 wherein said notification further comprises a subscriber identification corresponding to said client device.

31. The system as claimed in claim 27 wherein said messenger delivers said corresponding notification message to said client device when said subscriber identification in said notification is matched to one of said user accounts in said proxy server.

32. The system as claimed in claim 31, wherein said messenger assigns a notification identification to said received notification from said web server and wherein said corresponding notification message includes said notification identification.

33. The system as claimed in claim 32, wherein said messenger further comprises a notification queue, said notification being queued in said notification queue when said messenger does not successfully deliver said corresponding notification message to said client device.

34. The system as claimed in claim 33, wherein said client device comprises a counter responsible for keeping track of said notification identification of said notification received as said corresponding notification message from said messenger via said narrowband channel.

35. The system as claimed in claim 34, wherein said client device sends said notification identification to said pull engine when said client device establishes a communication session with said pull engine via said wideband channel.

36. The system as claimed in claim 35, wherein said pull engine consults with said messenger to determine if said notification identification sent from said client device is the last notification identification said messenger has assigned.

37. The system as claimed in claim 36, wherein said pull engine retrieves queued notifications in said notification queue when said notification identification sent from said client device is not the last notification identification said messenger has assigned.

38. The system as claimed in claim 37, wherein said pull engine forwards said retrieved notifications to said client device via said wideband channel and wherein said counter in said client device updates for each of said retrieved notifications received from said pull engine.

39. The system as claimed in claim 38, wherein said pull engine further forwards to said client device said updated specific information according to said address sent from said client device when client device is caused to fetch said updated specific information.

40. The system as claimed in claim 39, wherein said client device displays said updated specific information on a display screen integral in said client device.

41. A system containing program code for integrating a narrowband channel and a wideband channel, said system comprises:
   first program code for maintaining a user account of a client device at a link infrastructure; said link infrastructure comprising a proxy server and a carrier infrastructure; said carrier infrastructure comprising a messaging system capable of sending a message of no more than a predefined length;
   second program code for establishing a messenger at said proxy server;
   third program code for establishing a pull engine at said proxy server and; said pull engine communicating with said messenger;
   forth program code for receiving a notification from, via the Internet using a first communication protocol, a web server containing specific information subscribed by said client device when said specific information is updated, said notification comprising a subscriber ID of said client device and an address identifying said updated specific information;

fifth program code for verifying said subscriber ID from said notification with said user account in said proxy sever device;

sixth program code for constructing in said messenger a corresponding message from said notification;

seventh program code for sending said corresponding message by said messaging system, via said narrowband channel, to said client device if said subscriber ID is matched to said user account by said fifth program code, wherein said corresponding message includes a client device identification identifying said client device; and eighth program code for receiving a request from said client device and sending said updated specific information from said web server to said client device across said wideband channel upon receiving said request from said client device.

42. The system as recited in claim 41, wherein said notification further comprises an action type and a title identifying said specific information updated at said web server;

wherein said corresponding message comprises said title and said action type and wherein said client device comprises program code for reacting accordingly with respect to said action type in said corresponding message when received.

43. The system as recited in claim 42, wherein said client device program code comprises program code for invalidating a cached copy of said specific information in said client device when said corresponding mess is received such that said updated specific information has to be fetched when said cached copy is accessed.

44. The system as recited in claim 43, said client device program code further comprising program code for displaying said title identifying said specific information updated at said web server.

45. The system as recited in claim 42, wherein said client device program code comprises program code for causing said client device to generate an alert message to make a user of said client aware of said specific information updated at said web server.

46. The system as recited in claim 43, wherein said sixth program code comprises:

program code for encoding said corresponding message, according to a predefined encoding/decoding scheme, to a data format transportable by said message system;

program code for determining if said data format has a total length greater than said predefined length limited by said messaging system; and program code for segmenting said data format into a plurality of message fragments, each having a length no more than said predefined length.

47. The system as recited in claim 46, wherein said program code for segmenting said data format into a plurality of message fragments comprises:

program code for assigning, respectively, a sequence number to each of said plurality of said message fragments.

48. The system as recited in claim 47, wherein said data format is in alphanumeric characters and wherein said predefined length is 160 characters.

49. The system as recited in claim 47, wherein said seventh program code for sending said corresponding message by said messaging system comprises:

program code for sending, successively and respectively, each of said plurality of said message fragments.

50. The system as recited in claim 49, wherein said client device further comprises:

program code for reassembling said plurality of said message fragments to said data format according to said sequence number of each of said plurality of said message fragments.

51. The system as recited in claim 50, wherein said system further comprises client device program code for fetching said updated specific information from said web server, wherein said client device program code comprises:

program code for making a request to establish a communication session with said pull engine via said wideband channel using second communication protocol;

program code for authenticating said client device with said user account;

program code for receiving said address from said client device if said authenticating is successful; and program code for fetching said updated specific information by said pull engine using said first communication protocol from said web server.

52. The system as recited in claim 51, wherein said first communication protocol is HyperText Transfer Protocol (HTTP) and wherein said second communication protocol is Handheld Device Transfer Protocol (HDTP).

53. The system as recited in claim 41, further comprising program code for assigning a notification identification to said notification received in said messenger.

54. The system as recited in claim 53, wherein said corresponding message includes said notification identification.

55. The system as recited in claim 54, wherein said client device further comprises program code for keeping track of said notification identification in a counter in said client device when said corresponding message is received.

56. The system as recited in claim 55, wherein said system further comprises client device program code, said client device program code comprising:

program code, in said client device, for initiating a communication session between said client device and said pull engine via said wideband channel; and program code for sending said request including said notification identification to said pull engine when said communication session is successfully established.

57. The system as recited in claim 56, wherein said client device further comprises:

program code for updating said counter for each of said queued notifications received with respect to said corresponding notification identification of each of said queued notifications.

58. The system as recited in claim 57, wherein said client device further comprises:

program code for rejecting each of said queued notifications forwarded from said messaging system via said narrowband channel.

* * * * *